(12) United States Patent
Kim et al.

(10) Patent No.: US 9,340,427 B2
(45) Date of Patent: May 17, 2016

(54) CARBON MATERIALS BASED ON ORGANIC NANOFILM USING THERMAL EVAPORATION AND METHOD FOR PREPARING THE SAME

(71) Applicant: KOREA INSTITUTE OF SCIENCE AND TECHNOLOGY, Seoul (KR)

(72) Inventors: Tae-Wook Kim, Gyeonggi-do (KR); Han-Ik Joh, Jeollabuk-do (KR); Sung Ho Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 51 days.

(21) Appl. No.: 13/771,788

(22) Filed: Feb. 20, 2013

(65) Prior Publication Data

US 2014/0120030 A1 May 1, 2014

(30) Foreign Application Priority Data

Oct. 29, 2012 (KR) .................. 10-2012-0120593

(51) Int. Cl.
| | | |
|---|---|---|
| *C01B 31/02* | (2006.01) | |
| *B82Y 40/00* | (2011.01) | |
| *C01B 31/04* | (2006.01) | |
| *B82Y 30/00* | (2011.01) | |

(52) U.S. Cl.
CPC ............ *C01B 31/02* (2013.01); *B82Y 30/00* (2013.01); *B82Y 40/00* (2013.01); *C01B 31/0446* (2013.01); *C01B 31/0453* (2013.01)

(58) Field of Classification Search
CPC . C01B 31/0438; C01B 31/0446; B82Y 40/00
USPC ............... 423/445 B; 427/384, 385.5, 388.1
See application file for complete search history.

(56) References Cited

U.S. PATENT DOCUMENTS

| | | | |
|---|---|---|---|
| 5,352,524 A | 10/1994 | Nagata | |
| 6,309,532 B1 | 10/2001 | Tran et al. | |
| 6,372,192 B1 | 4/2002 | Paulauskas et al. | |
| 8,597,738 B2 * | 12/2013 | Yu et al. ................ | 427/596 |
| 8,697,230 B2 * | 4/2014 | Ago et al. ................ | 428/220 |
| 8,884,310 B2 * | 11/2014 | Seacrist et al. ............ | 257/77 |
| 2007/0013094 A1 | 1/2007 | Bischofsberger et al. | |
| 2008/0014426 A1 | 1/2008 | Nishikawa et al. | |
| 2010/0112322 A1 | 5/2010 | Kumar et al. | |
| 2010/0187482 A1 | 7/2010 | Mullen et al. | |
| 2012/0234695 A1 | 9/2012 | Mayes et al. | |

FOREIGN PATENT DOCUMENTS

| | | |
|---|---|---|
| JP | 2009-203127 A | 10/2009 |
| JP | 2012-250881 A | 12/2012 |
| KR | 1020060015252 A | 2/2006 |
| KR | 1020090026568 A | 3/2009 |
| KR | 1020090043418 A | 5/2009 |
| KR | 1020090065206 A | 6/2009 |
| KR | 1020100120492 A | 11/2010 |
| KR | 101063359 B1 | 9/2011 |
| KR | 101092378 B1 | 12/2011 |
| KR | 10-1121557 B2 | 2/2012 |
| KR | 1020120010142 A | 2/2012 |

OTHER PUBLICATIONS

Zhengzong Sun, et al; "Growth of graphene from solid carbon sources", Nature, vol. 468, pp. 549-552, Nov. 25, 2010.
S. Adhikari, et al; "Enhanced conductivity in iodine doped polyaniline thin film formed by thermal evaporation", Thin Solid Films, vol. 518, pp. 5421-5425, Available online Mar. 27, 2010.
Jingwei Bai, et al; "Graphene nanomesh", Nature nanotechnology; vol. 5; Published online Feb. 14, 2010; pp. 190-194.
Sung-Jung Byun, et al; "Graphenes Converted from Polymers", The Journal of Chemistry Letters; vol. 2, pp. 493-497; Published Feb. 18, 2011.
Mubarak A. Khan, et al; "Effect of Alkali and Ultraviolet (UV) Radiation Pretreatment on Physical and Mechanical Properties of 1,6-Hexanediol Diacrylate-Grafted Jute Yarn by UV Radiation", Journal of Applied Polymer Science, vol. 92, Issue 1, pp. 18-24, Jan. 27, 2004.
A.N. Obraztsov, et al; "Chemical vapor deposition of thin graphite films of nanometer thickness", Carbon, vol. 45, pp. 2017-2021; Available online Jun. 24, 2007.
M.S.A. Rahaman, et al; "A review of heat treatment on polyacrylonitrile fiber", Polymer Degradation and Stability, vol. 92, pp. 1421-1432; Available online Apr. 14, 2007.
USPTO RR dated Apr. 30, 2015 in connection with U.S. Appl. No. 13/292,326.
USPTO NFOA dated Sep. 25, 2015 in connection with U.S. Appl. No. 13/292,326.
USPTO NFOA dated Jan. 15, 2015 in connection with U.S. Appl. No. 13/871,285.
USPTO FOA dated Aug. 21, 2015 in connection with U.S. Appl. No. 13/871,285.

\* cited by examiner

*Primary Examiner* — Stuart Hendrickson
(74) *Attorney, Agent, or Firm* — Ladas & Parry LLP

(57) ABSTRACT

Provided is a method for preparing a carbon material based on an organic nanofilm using thermal evaporation, including: depositing a liquid polymer or polymer solution containing a polymer and a solvent onto a substrate, thereby forming an organic nanofilm; stabilizing the organic nanofilm so that the carbon atoms in the organic nanofilm have a cyclic arrangement; and carbonizing the stabilized organic nanofilm, thereby forming a carbon material, wherein the organic nanofilm is formed from the liquid polymer or polymer solution through a thermal evaporation process. The method provides a carbon material with a thickness, sheet resistance and surface roughness suitable for various applications and allows control thereof. In addition, the method uses a relatively inexpensive starting material, pitch, thereby reducing the overall production cost, and avoids a need for a complicated additional patterning operation, so that the carbon material is applied directly to electronic devices.

14 Claims, 6 Drawing Sheets

Pitch 40nm

CARBON MATERIALS BASED ON ORGANIC NANOFILM USING THERMAL EVAPORATION AND METHOD FOR PREPARING THE SAME

CROSS-REFERENCE TO RELATED APPLICATION

This application claims priority to Korean Patent Application No. 10-2012-0120593, filed on Oct. 29, 2012, and all the benefits accruing therefrom under 35 U.S.C. §119, the contents of which in its entirety are herein incorporated by reference.

BACKGROUND

1. Field

The present disclosure relates to a carbon material based on an organic nanofilm using thermal evaporation and a method for preparing the same. More particularly, the present disclosure relates to a carbon material based on an organic nanofilm using thermal evaporation and a method for preparing the same, the carbon material being obtained by using solid pitch obtained from inexpensive petroleum residue oil or coal to produce a carbon material such as graphene or a carbon nanofilm through thermal evaporation.

2. Description of the Related Art

Carbon materials having excellent physical and chemical properties have been used in various industrial fields. For example, carbon materials, such as graphene, graphite, a carbon nanofilm, a carbon nanotube and fullerene, have been spotlighted as materials for electric/electronic devices, optical devices and filter devices.

Among such carbon materials, graphene or a carbon nanofilm, particularly graphene has significantly higher electron transportability, thermal conductivity, mechanical strength and flexibility as compared to the existing device materials, and thus active studies have been conducted about them.

As disclosed in the related art, including Korean Laid-Open Patent Publication Nos. 10-2009-00265568, 10-2009-0043418 and 10-2010-0120492 and Korean Patent Registration Publication No. 10-1063359, graphene or a carbon nanofilm is produced by coating an organic film with a microscale thickness on a metal film functioning as a catalyst, followed by high-temperature carbonization.

However, according to the related art, the graphene and carbon nanofilm require an additional patterning operation so that they are applied to devices, particularly electronic devices, and such an operation is complicated and requires additional cost. In addition, selection of an organic molecule for use in such coating is difficult, and such a coating material is expensive even if it allows vapor deposition.

Therefore, we have conducted many studies to solve the above problems, and found that when a solid pitch-based material obtained from inexpensive petroleum residue oil or coal is used as a starting material, an organic nanofilm is formed by using a thermal evaporation process and a carbon material is obtained from the formed organic nanofilm, the overall cost is reduced and no additional operation is required. The present disclosure is based on this finding.

REFERENCES OF THE RELATED ART

Patent Document (Patent Document 1) Korean Laid-Open Patent Publication No. 10-2009-0026568 (2009.03.13)

(Patent Document 2) Korean Laid-Open Patent Publication No. 10-2009-0043418 (2009.05.06)

(Patent Document 3) Korean Laid-Open Patent Publication No. 10-2010-0120492 (2010.11.16)

(Patent Document 4) Korean Laid-Open Patent Publication No. 10-2009-0065206 (2009.06.22)

(Patent Document 5) Korean Patent Registration Publication No. 10-1063359

Non-patent Document (Non-patent Document 1) Nature, Z. Sun et al. (2010, 468, 549-552)

SUMMARY

The present disclosure is directed to providing a carbon material based on an organic nanofilm using thermal evaporation and a method for preparing the same, the carbon material being obtained by using solid pitch obtained from inexpensive petroleum residue oil or coal and a thermal evaporation process to reduce cost and to avoid an additional patterning operation.

In one aspect, there is provided a method for preparing a carbon material based on an organic nanofilm using thermal evaporation, the method including: depositing a liquid polymer or polymer solution containing a polymer and a solvent onto a substrate, thereby forming an organic nanofilm; stabilizing the organic nanofilm so that the carbon atoms in the organic nanofilm have a cyclic arrangement; and carbonizing the stabilized organic nanofilm, thereby forming a carbon material, wherein the organic nanofilm is formed from the liquid polymer or polymer solution through a thermal evaporation process.

According to an embodiment, the method may further include heating the carbon material obtained from the carbonizing operation at a temperature ranging from 1800° C. to 3000° C. to graphitize the carbon material.

According to an embodiment, the thermal evaporation process may be at least one evaporation process selected from the group consisting of thermal vapor deposition, microwave deposition, plasma deposition, laser deposition and thermal physical deposition.

According to an embodiment, the liquid polymer or polymer solution may include at least one selected from organic molecules and macromonomers, including pitch, and coal-based, petroleum-based, cellulose-based, lignin-based and natural polymer-based materials.

According to an embodiment, the substrate may include at least one selected from the group consisting of silicon, silicon compounds, silicon oxide, quartz, silicon nitride, silicon carbide, $Al_2O_3$, ZnO, GaN, GaAs and metals, including Cu, Ni, Co, Pt, Ru, Rh and Fe.

According to an embodiment, at least one patterned shadow mask may be used to perform selective deposition of the liquid polymer or polymer solution on the substrate during the operation of forming an organic nanofilm.

According to an embodiment, the method may further include controlling the rate of deposition of the liquid polymer or polymer solution during the operation of forming an organic nanofilm to control the thickness and uniformity of the carbon material to be produced.

According to an embodiment, the method may further include controlling the vaporization temperature of the liquid polymer or polymer solution or the degree of vacuum in a deposition chamber during the operation of forming an organic nanofilm to control the molecular weight of the polymer deposited on the substrate, thereby controlling the thickness and uniformity of the carbon material to be produced.

According to an embodiment, the liquid polymer or polymer solution may be vaporized at a temperature ranging from 50° C. to 500° C.

According to an embodiment, the degree of vacuum of the deposition chamber in which the liquid polymer or polymer solution is vaporized may be $10^{-3}$ to $10^{-11}$ torr.

According to an embodiment, the stabilizing operation may be carried out by at least one selected from the group consisting of heat treatment, alkali treatment and physical treatment, including plasma, ion beam, radiation, UV irradiation and microwaves.

According to an embodiment, the method may further include introducing at least one gas selected from doping gas and carbonizing atom-containing gas, including acetylene, ethylene and methane during the operation of forming a carbon material.

According to an embodiment, the stabilized organic nanofilm may be carbonized at a temperature ranging from 400° C. to 1800° C. to form the carbon material during the operation of forming a carbon material.

In another aspect, there is provided graphene obtained by any one method of the above-described embodiments.

In still another aspect, there is provided a carbon nanofilm obtained by any one method of the above-described embodiments.

The method for preparing a carbon material based on an organic nanofilm using thermal evaporation and the carbon material obtained thereby provide a carbon material with a thickness, sheet resistance and surface roughness suitable for various applications and allow control thereof. In addition, the method disclosed herein avoids a need for an additional complicated patterning operation, thereby reducing the overall production cost, and allows the carbon material to be applied directly to electronic devices.

BRIEF DESCRIPTION OF THE DRAWINGS

The above and other aspects, features and advantages of the disclosed exemplary embodiments will be more apparent from the following detailed description taken in conjunction with the accompanying drawings in which.

Figure 1A:
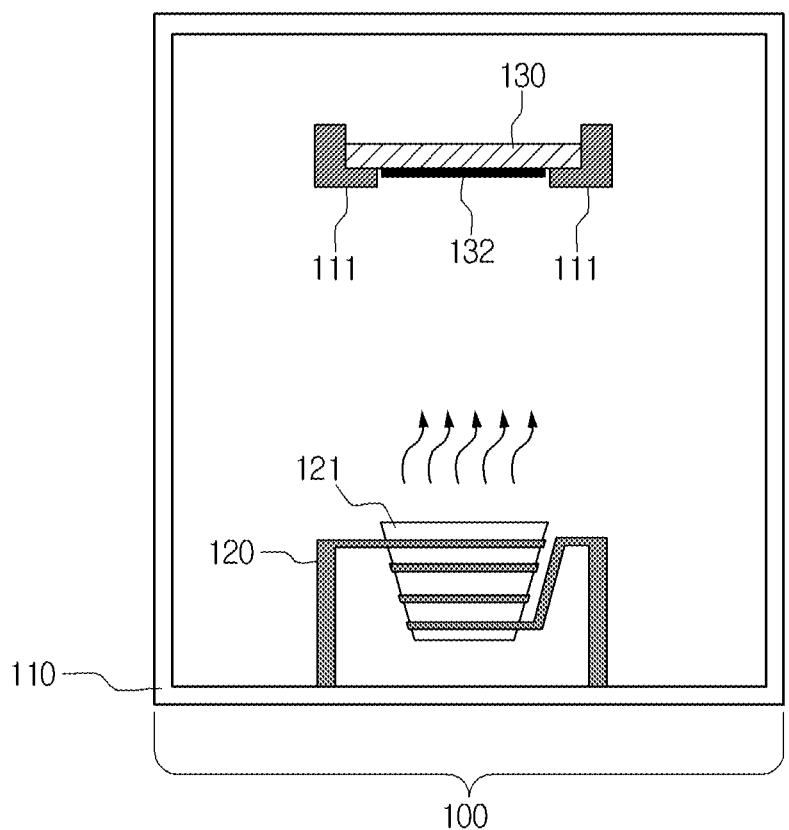
FIG. 1a is a schematic view illustrating a thermal evaporation process for preparing an organic nanofilm according to an embodiment.

DETAILED DESCRIPTION OF MAIN ELEMENTS 100, 200: deposition unit 110, 210: vacuum chamber 111, 211: substrate fixing member 120, 220: heat applying member 121, 221: crucible 130, 230: substrate 231: shadow mask 132, 232: liquid polymer or polymer solution deposited on substrate

DETAILED DESCRIPTION

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein.

The term 'carbon material' used in the overall text including claims and abstract is not particularly limited, as long as the carbon material includes carbon atoms having a cyclic arrangement. The carbon atoms may have a hexagonal cyclic arrangement. For example, the carbon material may be graphene or a carbon nanofilm. There is no particular limitation in the carbon material according to some embodiments, and the carbon material disclosed herein may have a film- or sheet-like shape.

In addition, the carbon material according to some embodiments may have a thickness of 0.1-1000 nm, particularly 0.1-100 nm. The carbon material may have a deviation in thickness of 1-50 nm.

Hereinafter, some embodiments of the present disclosure will be described.

According to an embodiment, the method for preparing a carbon material based on an organic nanofilm using thermal evaporation includes: depositing a liquid polymer or polymer solution containing a polymer and a solvent onto a substrate, thereby forming an organic nanofilm; stabilizing the organic nanofilm so that the carbon atoms in the organic nanofilm have a cyclic arrangement; and carbonizing the stabilized organic nanofilm, thereby forming a carbon material, wherein the organic nanofilm is formed from the liquid polymer or polymer solution through a thermal evaporation process.

When forming an organic nanofilm, the substrate is not particularly limited as long as it allows deposition of a liquid polymer or polymer solution thereon to form an organic nanofilm. For example, the substrate may include at least one selected from the group consisting of silicon, silicon compounds, silicon oxide, quartz, silicon nitride, silicon carbide, $Al_2O_3$, ZnO, GaN, GaAs and metals, including Cu, Ni, Co, Pt, Ru, Rh and Fe.

The liquid polymer or polymer solution containing a polymer and solvent includes carbon atoms. Particularly, such a liquid polymer or polymer solution may include at least one selected from organic molecules and macromonomers, including pitch, and coal-based, petroleum-based, cellulose-based, lignin-based and natural polymer-based materials. For example, pitch is a black- or dark brown-colored residue obtained from a chemical process. Various methods have been suggested to obtain pitch. For example, pitch may be obtained by distillation of coal tar, wood tar, fat, fatty acids, fat oil or the like, purification of petroleum, pyrolysis of polyvinyl chloride (PVC) or pyrolysis of cyclic compounds, such as naphthalene or anthracene. In addition, pitch may be obtained from natural asphalt (e.g. trinidad). When preparing a carbon material starting from such inexpensive pitch, cost efficiency is significantly improved as compared to the related art.

The liquid polymer or polymer solution may be deposited on a substrate by various deposition processes to form an organic nanofilm. However, according to the present disclosure, a thermal evaporation process is used to form an organic nanofilm.

The thermal evaporation process used herein is not particularly limited as long as it allows deposition of a liquid polymer or polymer solution on a substrate. Particularly, thermal vapor deposition, microwave deposition, plasma deposition, laser deposition and thermal physical deposition may be used. More particularly, the system shown in FIG. 1a and FIG. 1b includes a deposition unit 100, 200 for thermal evaporation of a liquid polymer or polymer solution. A vacuum chamber 110, 210 is disposed in the deposition unit 100, and a crucible 121, 221 in which a liquid polymer or polymer solution may be received is disposed in the vacuum chamber. In addition, the crucible 121, 221 is provided with a heat applying member 120, 220 to apply heat to the crucible. The heat applying member 120, 220 may be in direct contact with the crucible 121, 221 to increase heat transfer efficiency. The heat emitted from the heat applying member allows evaporation of the liquid polymer or polymer solution received in the crucible, and the evaporated liquid polymer or polymer solution is deposited on a substrate 130, 230 fixed by a fixing member 111, 211. In this manner, the liquid polymer or polymer solution is deposited (132, 232) on the substrate to form an organic nanofilm.

The method may further include a patterning operation in the operation of forming an organic nanofilm. The patterning operation may be carried out by using at least one shadow mask 231 during the operation of forming an organic nanofilm. By doing so, it is possible to obtain a selectively patterned organic nanofilm, thereby avoiding a need for an additional patterning operation.

When patterning is carried out without any shadow mask 231, a pre-patterning operation using a patterning resist, such as photolithography, nanoimprinting or e-beam lithography, may be performed before the above-mentioned deposition process is carried out to form an organic nanofilm. Then, a solvent in which the deposited organic molecules are not soluble but the patterning resist is soluble may be used to remove the patterning resist, thereby patterning the organic nanofilm.

When forming the organic nanofilm, the rate of organic nanofilm formation may be controlled to control the thickness of the carbon material to be produced finally. Particularly, it is possible to control the thickness and uniformity of the carbon material to be produced finally by controlling the deposition rate of a liquid polymer or polymer solution.

In addition, when forming the organic nanofilm, it is possible to control the thickness and uniformity of the carbon material to be produced finally by adjusting the vaporization temperature of the liquid polymer or polymer solution or the vacuum condition within the deposition chamber to control the molecular weight of the polymer deposited on the substrate. Particularly, the vaporization temperature may be 50° C.-500° C., more particularly 70° C.-200° C.

Further, the vacuum degree within the deposition chamber may be $10^{-3}$-$10^{-11}$ torr, particularly $10^{-4}$-$10^{-9}$ torr.

Within the above defined temperature and pressure ranges, it is possible to carry out vaporization of the liquid polymer or polymer solution with ease.

Then, the organic nanofilm is subjected to stabilization. While the organic nanofilm is subjected to stabilization, the carbon atoms in the organic nanofilm are allowed to have a cyclic arrangement, and thus maintain a uniform organic nanofilm structure without any cleavage in the polymer chain. The stabilization may be carried out by heat treating the organic nanofilm, chemically stabilizing the organic nanofilm with a strong alkaline aqueous solution or strong alkaline organic solution, or by treating the organic nanofilm with at least one selected from plasma, ion beams, radiation, UV irradiation and microwaves. In addition, comonomers may be used to modify the structure of a polymer chain or to induce chemical crosslinking of the polymer chain.

Then, the stabilized organic nanofilm is subjected to carbonization. While the organic nanofilm is subjected to carbonization, the organic nanofilm is converted into a carbon material. The carbonization may be carried out by treating the organic nanofilm at a temperature ranging from 400° C. to 1800° C. in the atmosphere of inert gas or inert gas containing at least one gas, such as hydrogen, under vacuum. To improve the quality of the carbon material to be produced, a carbonizing atom-containing gas selected from doping gas, acetylene, ethylene, methane, etc. is also introduced to provide a finished carbon material.

To further improve the quality of the finished carbon material, the carbon material may be subjected to graphitization by heating it at a temperature ranging from 1800° C. to 3000° C. after forming the carbon material. The carbon material obtained herein, for example, graphene and a carbon nanofilm, may have a thickness corresponding to a single layer to 300 layers. In addition, the graphene and carbon film have a transverse and longitudinal length of 1 nm to 1 m.

When preparing a carbon material by the above-described method, it is possible to avoid a need for an additional patterning operation. In addition, use of an inexpensive starting material, pitch, simplifies the overall process and improves the cost efficiency.

Further, the finished carbon material obtained by the method, for example, graphene or a carbon nanofilm, has a material thickness, sheet resistance and surface roughness suitable for various applications, and is provided with excellent electrical conductivity, thermal conductivity and mechanical strength.

EXAMPLES

The examples will now be described. The following examples are for illustrative purposes only and not intended to limit the scope of the present disclosure.

Example 1

Solid pitch, petroleum residue oil, is used as a starting material to produce graphene and a carbon nanofilm through a thermal evaporation process. The thermal evaporation process is shown in FIG. 1a. First, bulk type pitch is pulverized to provide pitch powder, which, in turn, is transferred to a quartz crucible for thermal evaporation and the crucible is disposed on a tungsten coil of a vacuum thermal evaporation system.

Figure 2:
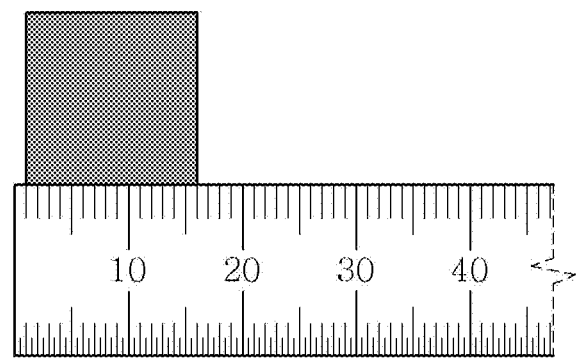
FIG. 2 shows an organic nanofilm obtained according to an embodiment.

While the system is maintained at a vacuum degree of $5 \times 10^{-6}$ torr or less, electric current is applied to the tungsten coil to heat the inner part of the system. The pitch sublimated in the system is deposited on a silicon oxide substrate. Herein, a thickness monitor is used to determine the thickness of the deposited pitch film in a real-time manner, so that the film has a desired thickness. A thermally deposited pitch film with a thickness of 40 nm is shown in FIG. 2.

It is possible to control the organic nanofilm deposited as described above easily to a thickness of several nanometers to several tens nanometers. In addition, after the surface roughness is determined with an atomic force microscope, it can be seen that a uniform film having a deviation in thickness of 1 nm or less is formed. Then, the deposited pitch film is subjected to stabilization at 290° C. under air for 2 hours.

Figure 3:
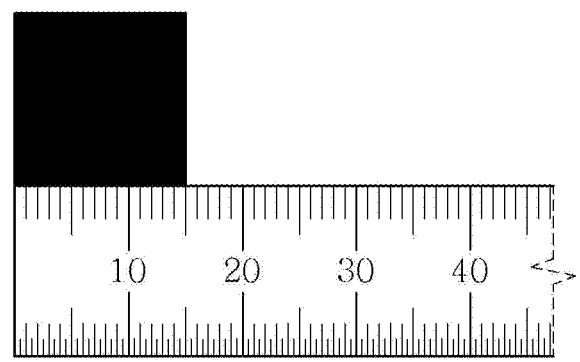
FIG. 3 shows a carbon material obtained after stabilizing and carbonizing an organic nanofilm according to an embodiment.

Then, the stabilized pitch film is subjected to carbonization under a mixed gas atmosphere of argon with hydrogen introduced at a rate of 2000 sccm up to 1000° C. at a warming rate of 5° C./min to obtain graphene and a carbon nanofilm. The graphene and carbon nanofilm are shown in FIG. 3.

When comparing the pitch film with the graphene and carbon nanofilm obtained from the pitch film through the stabilization and carbonization, a shrinkage of 60-70% is observed. Therefore, as shown in FIG. 3, the pitch film having a thickness of 40 nm is converted into graphene and carbon nanofilm having a thickness of about 8 nm.

Figure 4:
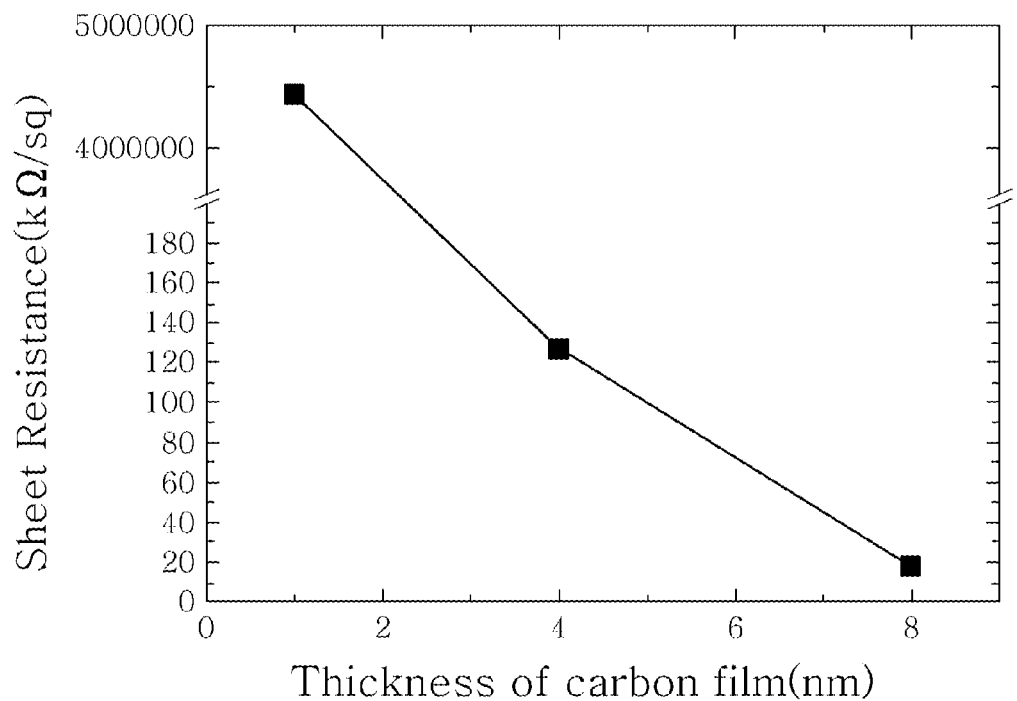
FIG. 4 is a graph illustrating the sheet resistance of a carbon material (graphene) obtained according to an embodiment.
Figure 5:
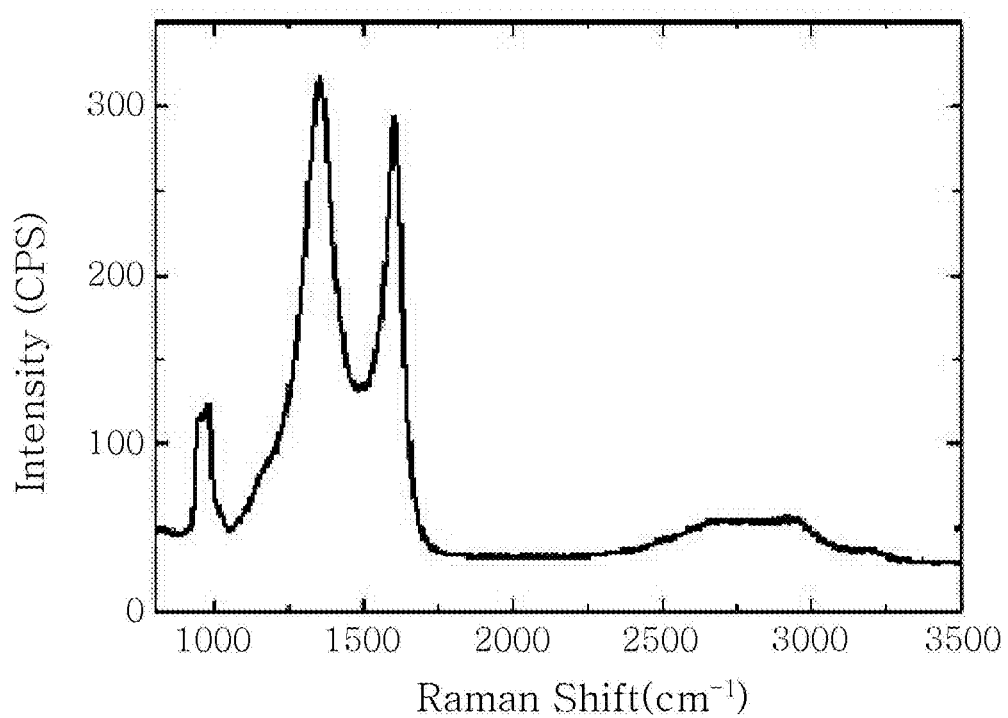
FIG. 5 is a graph illustrating the crystallinity of a carbon material (graphene) obtained according to an embodiment, as determined by Raman spectroscopy.

FIG. 4 shows the thickness of the prepared graphene and carbon nanofilm and the calculated sheet resistance thereof measured by a 4-probe method. FIG. 5 shows the results of Raman spectroscopy for determining the crystallinity of the graphene and carbon nanofilm. In general, a G'-band peak is observed at approximately 2680 cm$^{-1}$.

Example 2

Figure 1B:
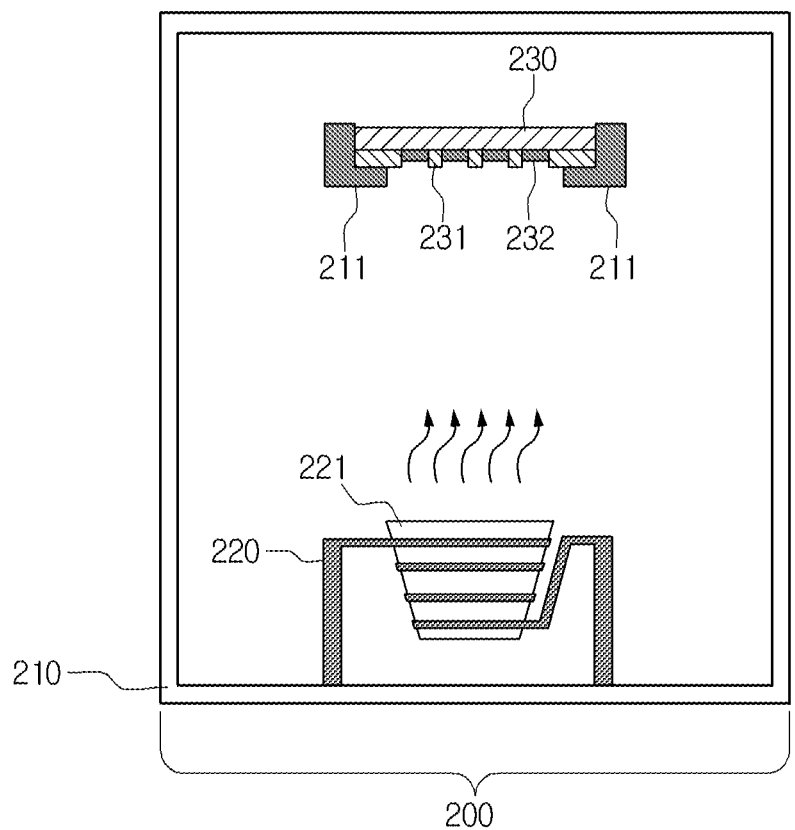
FIG. 1b is a schematic view illustrating a thermal evaporation process for preparing an organic nanofilm according to an embodiment, in which a shadow mask is further used to perform patterning.

Example 1 is repeated, except that a shadow mask is disposed on the silicon oxide substrate before carrying out deposition in order to deposit an organic nanofilm selectively on the silicon oxide substrate and to obtain patterned graphene and carbon nanofilm (see FIG. 1*b*).

Figure 6:
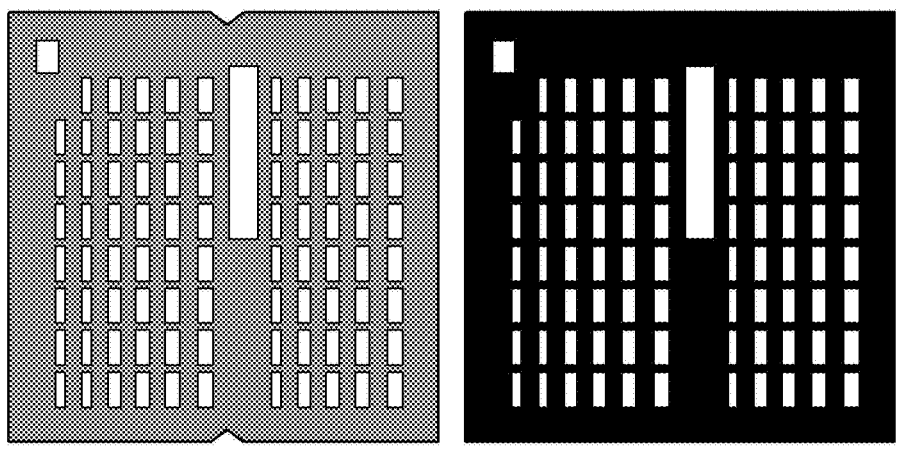
FIG. 6 shows a carbon material (graphene) patterned according to an embodiment.

As shown in FIG. 6, it can be seen that an organic nanofilm having the same shape as the shadow mask is deposited. It is possible to control the line width of the deposited organic nanofilm as a function of the line width of the shadow mask. In this manner, after the stabilization and carbonization, it is possible to obtain graphene and a carbon nanofilm having a line width of several nanometers or less from the organic nanofilm.

It is thought that the above-mentioned effect overcomes the limit of etching technology according to the related art, and realizes a small line width, thereby contributing to the integration of electronic devices.

While the exemplary embodiments have been shown and described, it will be understood by those skilled in the art that various changes in form and details may be made thereto without departing from the spirit and scope of the present disclosure as defined by the appended claims. In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A method for preparing a carbon material based on an organic nanofilm using thermal deposition, comprising:
    depositing a polymer onto a substrate, thereby forming an organic nanofilm wherein the substrate comprises at least one material selected from the group consisting of silicon, silicon oxide, quartz, silicon nitride, silicon carbide, $Al_2O_3$, ZnO, GaN, GaAs;
    stabilizing the organic nanofilm so that the carbon atoms in the organic nanofilm have a cyclic arrangement; and
    carbonizing the stabilized organic nanofilm, thereby forming a carbon material,
    wherein the organic nanofilm is formed from a solid polymer, a liquid polymer or a polymer solution containing the solid polymer and a solvent through a thermal deposition process,
    wherein the thermal deposition process is at least one deposition process selected from the group consisting of thermal vapor deposition, microwave deposition, plasma deposition, laser deposition and thermal physical deposition.

2. The method for preparing a carbon material based on an organic nanofilm using thermal deposition according to claim 1, wherein said stabilizing is carried out by at least one treatment selected from the group consisting of heat treatment, alkali treatment, and physical treatment.

3. The method according for preparing a carbon material based on an organic nanofilm using thermal deposition according to claim 1, wherein the method further comprises introducing at least one gas selected from the group consisting of doping gas and carbon atom-containing gas in said forming the carbon material.

4. The method for preparing a carbon material based on an organic nanofilm using thermal deposition according to claim 1, wherein the stabilized organic nanofilm is carbonized at a temperature ranging from 400° C. to 1800° C. in said forming the carbon material.

5. The method for preparing a carbon material based on an organic nanofilm using thermal deposition according to claim 1, wherein the polymer is selected from the group consisting of coal-based and petroleum-based polymers.

6. The method according for preparing a carbon material based on an organic nanofilm using thermal deposition according to claim 1, wherein at least one patterned shadow mask is used to perform selective deposition of the polymer on the substrate in said forming the organic nanofilm.

7. The method for preparing a carbon material based on an organic nanofilm using thermal deposition according to claim 1, which further comprises controlling a rate of deposition of the polymer in said forming the organic nanofilm to control a thickness and uniformity of the carbon material to be produced.

8. The method for preparing a carbon material based on an organic nanofilm using thermal deposition according to claim 1, which further comprises controlling a vaporization temperature of the solid polymer, the liquid polymer or polymer solution or a degree of vacuum in a deposition chamber in said forming the organic nanofilm to control an amount of the polymer deposited on the substrate, thereby controlling a thickness and uniformity of the carbon material to be produced.

9. The method for preparing a carbon material based on an organic nanofilm using thermal deposition according to claim 8, wherein the solid polymer, the liquid polymer or the polymer solution is vaporized at a temperature ranging from 50° C. to 500° C.

10. The method for preparing a carbon material based on an organic nanofilm using thermal deposition according to claim 8, wherein the degree of vacuum of the deposition chamber is $10^{-3}$ to $10^{-11}$ torr.

11. A method for preparing a carbon material based on an organic nanofilm using thermal deposition, comprising:
    depositing a polymer onto a substrate, thereby forming an organic nanofilm wherein the substrate comprises at least one material selected from the group consisting of silicon, silicon oxide, quartz, silicon nitride, silicon carbide, $Al_2O_3$, ZnO, GaN, GaAs;
    stabilizing the organic nanofilm so that the carbon atoms in the organic nanofilm have a cyclic arrangement; and
    carbonizing the stabilized organic nanofilm, thereby forming a carbon material,
    wherein the organic nanofilm is formed from a solid polymer, a liquid polymer or a polymer solution containing the solid polymer and a solvent through a thermal deposition process, wherein the method further comprises heating the carbon material obtained from the carbonizing operation at a temperature ranging from 1800° C. to 3000° C. to graphitize the carbon material.

12. A method for preparing a carbon material based on an organic nanofilm using thermal deposition, comprising:
  depositing a polymer onto a substrate, thereby forming an organic nanofilm wherein the substrate comprises at least one material selected from the group consisting of silicon, silicon oxide, quartz, silicon nitride, silicon carbide, $Al_2O_3$, ZnO, GaN, GaAs;
  stabilizing the organic nanofilm so that the carbon atoms in the organic nanofilm have a cyclic arrangement; and
  carbonizing the stabilized organic nanofilm, thereby forming a carbon material,
  wherein the organic nanofilm is formed from a solid polymer, a liquid polymer or a polymer solution containing the solid polymer and a solvent through a thermal deposition process,
  wherein the polymer comprises at least one material selected from the group consisting of coal-based materials, petroleum-based materials, cellulose-based materials, lignin-based materials, and natural polymer-based materials.

13. The method for preparing a carbon material based on an organic nanofilm using thermal deposition according to claim 12, wherein the polymer comprises pitch.

14. A method for preparing a carbon material based on an organic nanofilm using thermal deposition, comprising:
  depositing a polymer onto a substrate, thereby forming an organic nanofilm wherein the substrate comprises at least one material selected from the group consisting of silicon, silicon oxide, quartz, silicon nitride, silicon carbide, $Al_2O_3$, ZnO, GaN, GaAs;
  stabilizing the organic nanofilm so that the carbon atoms in the organic nanofilm have a cyclic arrangement; and
  carbonizing the stabilized organic nanofilm, thereby forming a carbon material,
  wherein the organic nanofilm is formed from a solid polymer, a liquid polymer or a polymer solution containing the solid polymer and a solvent through a thermal deposition process,
  wherein a shadow mask is used to perform the deposition, and a line width of the shadow mask is controlled to control a line width of the organic nanofilm.

* * * * *